METHOD OF MAKING A MAGNETIC POWDER

Filed June 21, 1971 2 Sheets-Sheet 1

INVENTORS.
MEIRO KAWASAKI
SHIGETAKA HIGUCHI
BY
Lewis H. Eslinger
ATTORNEY

METHOD OF MAKING A MAGNETIC POWDER

Filed June 21, 1971 2 Sheets-Sheet 2

INVENTORS.
MEIRO KAWASAKI
SHIGETAKA HIGUCHI
BY Lewis H. Eslinger
ATTORNEY

United States Patent Office 3,702,270
Patented Nov. 7, 1972

3,702,270

METHOD OF MAKING A MAGNETIC POWDER

Meiro Kawasaki, Tokyo, and Shigetaka Higuchi, Kanagawa, Japan, assignors to Sony Corporation, Tokyo, Japan Filed June 21, 1971, Ser. No. 154,949
Claims priority, application Japan, June 23, 1970, 45/54,581
Int. Cl. H01f *1/22*
U.S. Cl. 148—105 9 Claims

ABSTRACT OF THE DISCLOSURE

A method of preparing powders having improved magnetic properties for use in the manufacture of recording tapes is shown. A colloidal suspension of iron oxide is formed. A solution of a salt of cobalt and/or nickel is added to the colloidal suspension and the mixture is agitated and the pH thereof controlled to facilitate absorption of the cobalt and/or nickel salts on the iron oxide. The iron oxide is then removed from suspension, washed, dried and ground and then dehydrated to uniformly diffuse the cobalt or nickel into the iron oxide. The mass is then reduced to form the metallic alloy. The powders formed according to the invention have substantially increased values of coercive force and magnetization and are particularly suited for use in master video tapes.

This invention relates to a method of making a fine powder having improved magnetic properties. More particularly, this invention relates to a method of making a powder having substantially increased coercive force and magnetization for use in the manufacture of magnetic recording and reproducing media.

It is conventional practice to produce video tapes from a master or original magentic tape by contacting the master tape with a slave tape. High density magnetic tapes are used for master tapes; a signal is recorded on the master tape; and thereafter multiple slave tapes are printed by contact with the master. A drawback frequently encountered in conventional video tape production by the foregoing method is that the original recorded signal on the master tape is relatively easily erased or destroyed by the high frequency bias signal employed in the printing step.

The art has thus sought to avoid deterioration of master tapes by providing a master tape made of a magentic material having a high coercive force, $H_c$. It has been recognized that the coercive force of the master tape material should be 2 to 2.5 times that of the slave tape in order to avoid erasure or deterioration of the master tape signal. Thus if gamma-$Fe_2O_3$ is used as the magnetic material in a slave tape, the master tape material must be $CrO_2$, Fe-Co or Co-$Fe_2O_3$ (cobalt ferrite) to have sufficiently high coercive force.

It is thus a primary object of this invention to provide a method of making a magnetic material having substantially improved magnetic properties, for use in the production of master video tapes.

It is a further and related object of this invention to provide a powder having improved magnetic properties and, more specifically, having a coercive force of at least 700 and preferably 1000 oersted.

It is a further and related object of this invention to provide a magnetic material of iron-cobalt or iron-cobalt-nickel metallic composition, in fine powder form.

It is still a further and related object of this invention to provide a metallic powder the particles of which are acicular shaped.

It is still a further object of this invention to provide a method for preparing powders which differs from the so-called conventional co-precipitation method.

These and other objects of this invention are achieved in a method of preparing a powder having improved magnetic properties for use in the manufacture of recording tapes, which comprises the following steps. A colloidal suspension of an iron oxide is formed in water. A salt of a metal selected from the group consisting of cobalt, nickel and mixtures of cobalt and nickel and including the oxides and hydroxides thereof is then added to the colloidal suspension of the iron oxide and water. The mixture is agitated and the pH thereof is adjusted to between 8.5 and 11.5 and preferably between 9.0 and 11.5. With the pH at this level, the salt of cobalt and/or nickel is uniformly absorbed onto the iron oxide. The iron oxide having the absorbed salt thereon is then removed from the colloidal suspension and is washed, dried and finely divided. The finely divided mass is then dehydrated in a non-reducing atmosphere at a temperature of 600 to 750° C. The salt absorbed onto the iron oxide diffuses thereinto. The dehydrated mass is then reduced preferably in a hydrogen atmosphere at a temperature of between 300° C. and 450° C.

The iron oxide starting material is preferably a powder such as goethite (FeOOH in acicular form). Other iron oxides which are suitable for use are $Fe_2O_3$ (hematite) and $Fe_3O_4$ (magnetite).

The preferred salts of cobalt and nickel are cobalt hydroxide and nickel hydroxide. These are readily absorbed on the surface of the iron oxide powder in colloidal suspension. During the dehydration step, the cobalt and/or nickel is diffused into the surface of the iron oxide with the result than an acicular powder is obtained in which the cobalt and/or nickel is uniformly diffused. In the final step, the iron oxide having the metal diffused therein is reduced and the alloy in metallic form is thus obtained. This material, in powder form, is coated on a plastic film and because of its very substantially improved magnetic properties substantially improves the recording characteristics of the video tape.

The invention is further described in the following examples.

EXAMPLE I

Iron hydroxide such as goethite (FeOOH) having a particle size of from 0.3 to 0.4 micron and an acicular ratio of 7 to 8 is used as starting material. (Acicular ratio is defined as the ratio of the length of the particle to the width thereof.) 26.7 grams of goethite are dispersed in 700 cc. of water to form a colloidal suspension in which the goethite is completely dispersed. A second solution of 7.93 grams of cobalt chloride $CoCl_2 \cdot 6H_2O$ in 100 cc. of water is also formed. The solution of cobalt chloride is mixed together with the colloidal suspension of goethite and the mixture is agitated. 15 cc. of an aqueous solution of ammonia (14%) is added to the foregoing mixture. The pH of the resulting mixture is about 9.0. The mixture is allowed to stand for a time to permit the iron hydroxide to absorb the cobalt salt. Thereafter the iron hydroxide is removed from the suspension, washed by conventional technique, dried and then ground to a fine powder. The product resulting from the foregoing steps is an acicular form goethite with cobalt hydroxide $Co(OH)_2 \cdot Co(OH)_3$ absorbed on the surface thereof. 29 grams of this material are obtained.

Five grams of this intermediate product are then maintained at 700° C. for two hours in a non-reducing atmosphere of inert gas. The goethite with absorbed cobalt hydroxide is thereby dehydrated and the cobalt is completely and uniformly diffused into the goethite powder. The resulting Fe-Co oxide is then placed in a reducing furnace and hydrogen gas is passed, at the rate of 0.7 liter/minute, over the powder for 10 hours. The temperature is maintained at 320° C. After reduction, the metallic powder is immersed into methanol or toluene to avoid burning out. The resulting iron-cobalt alloy powder has a thin, stable oxide layer covering the surface of it. The powder consists of 90 atom percent iron and 10 atom percent cobalt. It is in the form of a fine acicular powder, the particles of which have a length of 0.2 to 0.3 micron and an acicular ratio of 4 to 5. It is thus observed that the size and shape of the particles formed are not substantially different from the size and shape of the particles of goethite used as a starting material.

The magnetic properties of the powder formed in this example are discussed below in connection with Table I.

EXAMPLE II 53.4 grams of goethite (FeOOH), having a length of 0.3 to 0.4 micron and an acicular ratio of 7 to 8 are mixed into 800 cc. of water and a colloidal suspension is thereby formed. A second solution consisting of 61.2 grams of cobalt chloride to which a solution of 14% ammonia in water is added are mixed into 200 cc. of water. A colloidal precipitate of cobalt hydroxide is thus obtained. The cobalt hydroxide is then completely mixed into the suspension of goethite. The pH of the mixed solution is about 9.0. After a period, during which the cobalt is absorbed on the surface of the iron oxide, the suspended matter is removed from suspension, washed, dried and then ground to a fine powder. The fine powder is then dehydrated and reduced by the technique disclosed in Example I. The final alloy powder consists of 70% iron and 30% cobalt and is in acicular form.

EXAMPLE III 1.3 kg. of goethite having a particle length of 0.3 to 0.4 micron and an acicular ratio of 7 to 8 are mixed into 30 liters of water. A second solution of 1.2 kg. of cobalt chloride and 248 grams of nickel chloride in 5 liters of water is also formed. The cobalt and nickel solution is then mixed into the goethite suspension. The pH value of the mixture is adjusted by addition of five normal sodium hydroxide until the pH value is about 9.5. After standing for some time, an acicular form goethite on which cobalt hydroxide and nickel hydroxide are absorbed is obtained. The resultant goethite is then put into a rotary furnace and dehydrated at 700° C. for 2 hours in a stream of nitrogen flowing at 2 liters per minute. After this heat treatment, the powder is reduced at 320° C. for 10 hours in the presence of hydrogen gas flowing at the rate of 2 liters per minute. The product is an iron-cobalt-nickel metallic powder. About 1 kg. is obtained. The composition of the powder is approximately 70 atom percent iron, 25 atom percent cobalt and 5 atom percent nickel.

The following table lists the magnetic properties of powders formed according to the processes of this invention and, for comparison, the magnetic properties of gamma-$Fe_2O_3$ (maghemite) are also shown.

TABLE I

| Specimen | Hc (oersted) | $\sigma$g. (e.m.u./gram) |
|---|---|---|
| Example I | 960 | 152 |
| Example II | 860 | 179 |
| Example III | 820 | 165 |
| $\gamma$-$Fe_2O_3$ (conventional) | 320 | 76 |

It has been found that the temperature at which the iron oxide having absorbed cobalt and/or nickel salts is dehydrated should not be less than 600° C. and should not be more than 750° C. Within this temperature range, the surface area of a particle of goethite will be substantially increased by absorption of the metal salts, and, as is well known, the larger the surface area of each particle the better the magnetic properties. Furthermore, the cobalt and/or nickel absorbed on the surface of each particle of iron hydroxide are uniformly and completely diffused into the many pores of the iron oxide particle. In this way a uniform and stable magnetic powder is obtained. It has been found that if the temperature is less than 600° C., satisfactory magnetic properties, particularly magnetization, cannot be obtained. Likewise, at temperatures in excess of 750° C. the growth of each particle is so greatly increased that the particle becomes circular or drop shaped rather than acicular. If this happens, the magnetic properties particularly coercive force ($H_c$) are decreased.

In order to more fully explain the relationship between the magnetic properties of the powders produced according to the processes of this invention with the several variables encountered in the production processes, curves showing these relationships have been presented in the drawings.

Figure 1:
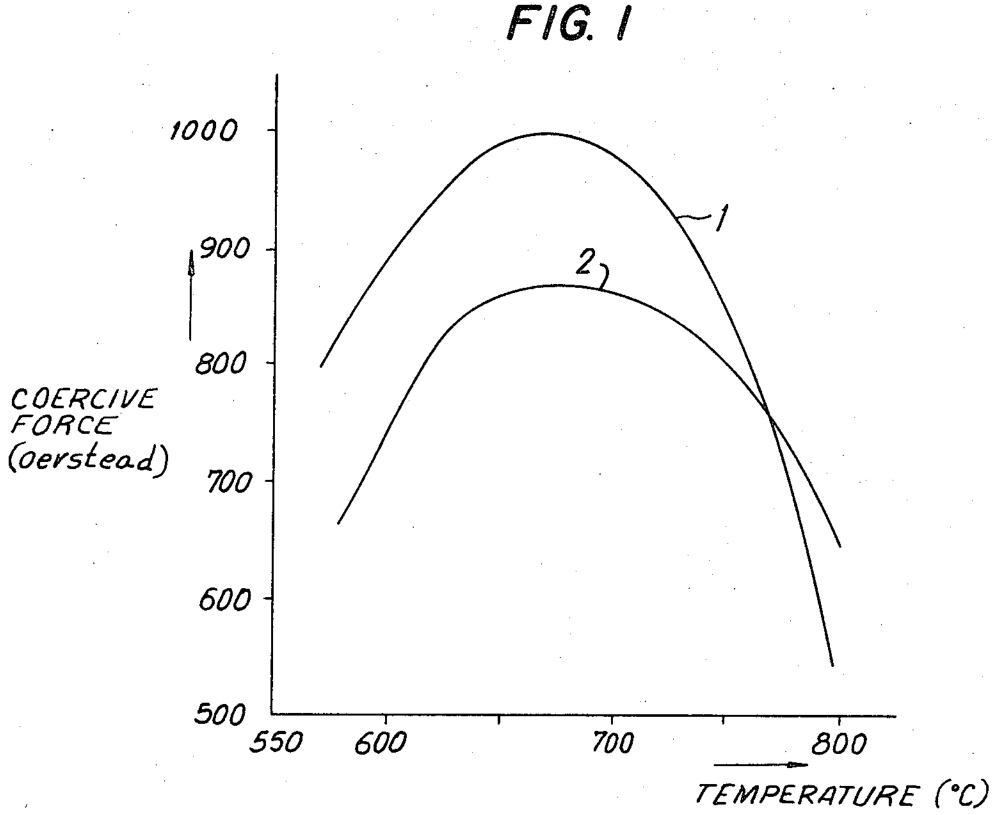
FIG. 1 shows the relationship between coercive force, $H_c$, and dehydration temperature.

With reference to the drawings, in FIG. 1 the curve identified by numeral 1 relates the coercive force to the dehydration temperature, for powders obtained by the process of Example I. The product powder contains 10 atom percent cobalt and 90 atom percent iron. The curve identified by numeral 2 is for the metallic powder obtained by the process described in Example II. The powder contains 30 atom percent cobalt and 70 atom percent iron. It can be seen from FIG. 1 that the maximum coercive force is obtained at a temperature of approximately 670° C.

Figure 2:
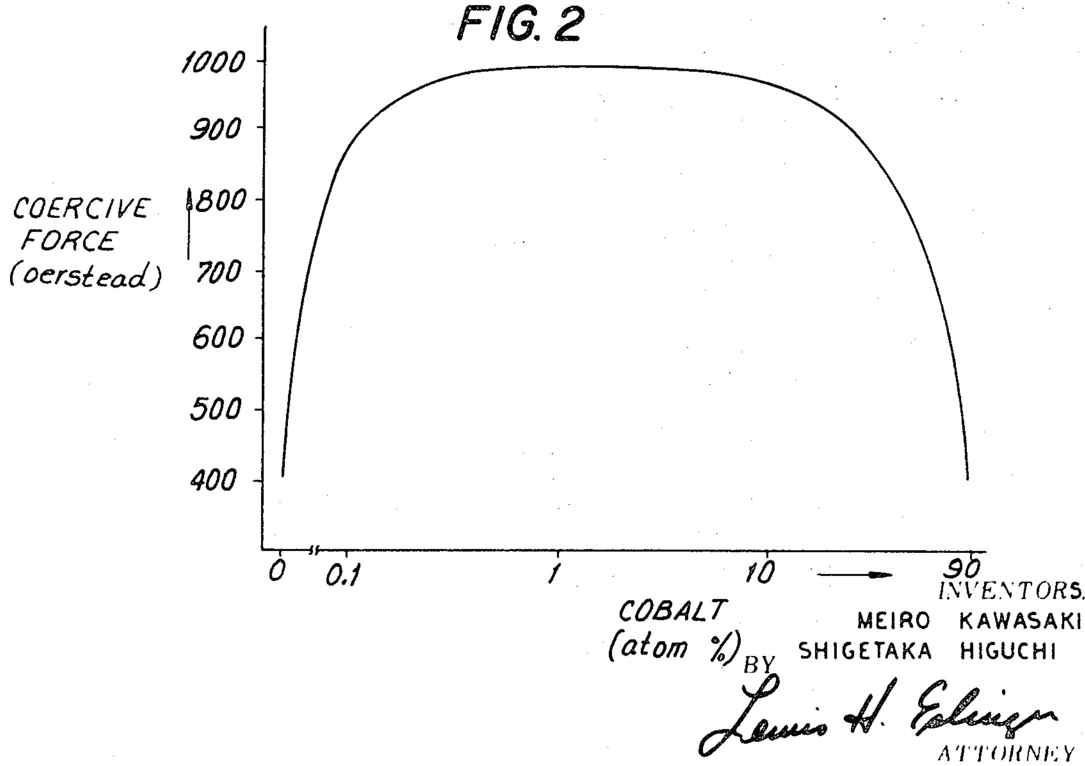
FIG. 2 shows the relationship between coercive force, Hc, and the amount of cobalt in the product metallic powder.

With reference now to FIG. 2, the curve there indicates that a relatively high coercive force $H_c$ can be obtained over a broad range of cobalt concentration. It has been found that satisfactory coercive forces are obtained in powder containing from 0.1 atom percent cobalt to 70 atom percent cobalt.

Figure 3:
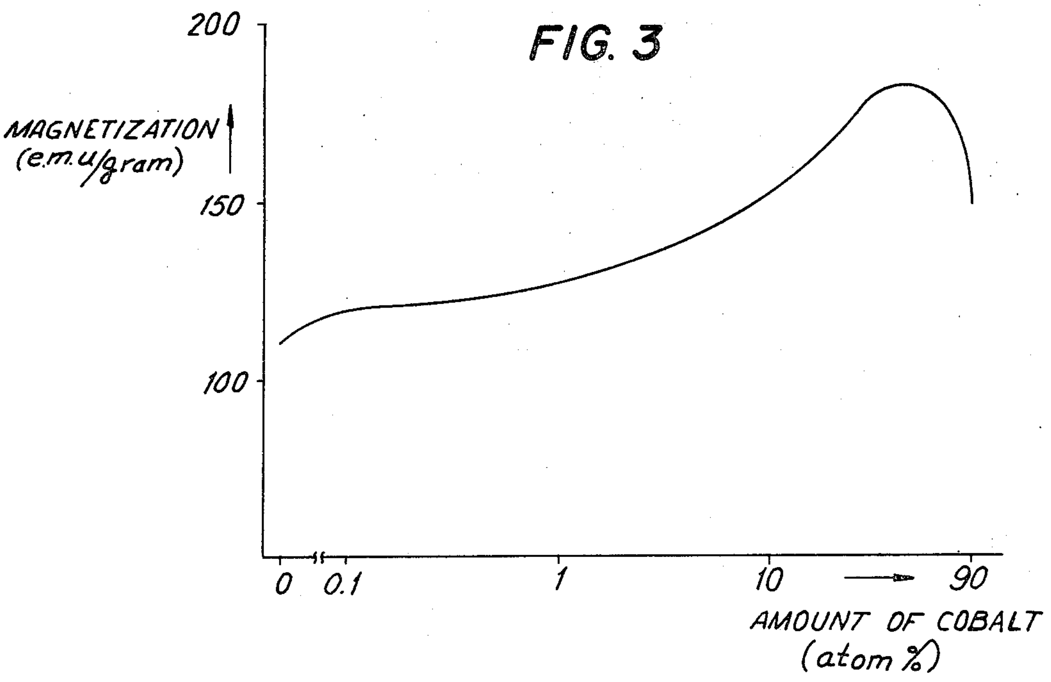
FIG. 3 shows the relationship between magnetization, $\sigma$g., and the amount of cobalt in the product metallic powder.

With reference now to FIG. 3, the curve there indicates that magnetization, $\sigma$g., increases as the percentage of cobalt in the metallic powder increases and that, $\sigma$g. decreases after the percentage of cobalt exceeds 50 atom percent.

Figure 4:
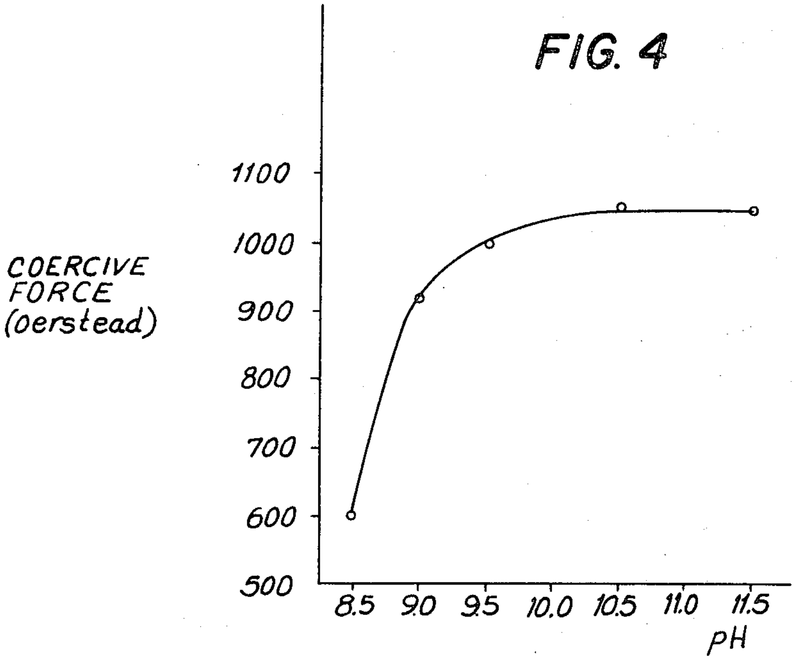
FIG. 4 shows the relationship between coercive force, $H_c$, and the pH value of the colloidal suspension of iron oxide and cobalt and/or nickel salts.

With reference to FIG. 4, the curve there indicates that a pH of at least 9.0 should be used in the colloidal suspension of iron oxide with iron or nickel salts in order to obtain satisfactory values of coercive force. The data presented in FIG. 4 were obtained from the process of Example I, only the amount of ammonia introduced to the mixture being varied to adjust the pH value in the range of 8.5 to 11.5.

It is particularly preferred that the dehydration step be carried out at temperatures from 600 to 650° C. Most satisfactory values of coercive force and magnetization are obtained if the temperature of the dehydration step is within this range. It is also preferred that the reducing temperature be relatively low, i.e. from 300° C. to 450° C. but that the reduction time be relatively long, i.e. 10 to 20 hours.

It has been found that when using the process as disclosed herein the coercive force of the powders obtained are greater than 700 oersted and the magnetization greater than 120 e.m.u./gram. The powders are thus particularly useful for forming master video tapes from which multiple slave tapes can be printed.

What is claimed is:

1. A method of preparing powder having improved magnetic properties for use in the manufacture of recording tapes, comprising the steps of: forming a colloidal suspension of iron oxide in water; adding to said suspension a salt of a metal selected from the group consisting of cobalt, nickel and mixtures of cobalt and nickel; adjusting the pH of the mixture so formed to between 8.5 and 11.5 thereby allowing the said iron oxide to absorb said salt; removing the iron oxide having absorbed salt thereon; drying and finely dividing said iron oxide; dehydrating said finely divided iron oxide in a non-reducing atmosphere at a temperature of 600 to 750° C. and thereby dehydrating it; and reducing said dehydrated iron oxide.

2. The process of claim 1 wherein the pH of the said mixture of iron oxide colloidal suspension and salt is at least 9.0.

3. The process of claim 1 wherein said iron oxide is goethite.

4. The process of claim 1 wherein said salt is a salt of cobalt.

5. The process of claim 1 wherein said salt comprises a mixture of cobalt and nickel salts.

6. The process of claim 1 wherein said salt is cobalt hydroxide.

7. The process of claim 1 wherein the dehydration is carried out at a temperature of from 600 to 650° C.

8. The process of claim 1 wherein the reduction of the dehydrated iron oxide is carried out at a temperature between 300 and 450° C.

9. The process of claim 1 wherein the coercive force, $H_c$, of the product powder is greater than 700 oersted and the magnetization, $\sigma g.$, is greater than 120 e.m.u./gram.

References Cited

UNITED STATES PATENTS

| | | | |
|---|---|---|---|
| 3,607,220 | 9/1971 | Vander Giessen et al. | 75—0.5 AA |
| 3,598,568 | 8/1971 | Klomp et al. ------- | 148—105 X |
| 3,607,219 | 9/1971 | Vander Giessen et al. | 75—0.5 BA |
| 3,607,219 | 9/1971 | Vander Giessen et al. | 75—0.5 BA |
| 3,634,063 | 1/1972 | Hwang ------------ | 75—0.5 AA |

OTHER REFERENCES

Judge, J. S. et al., Preparation of Magnetic Particles, IBM Technical Disclosure Bulletin, vol. 9, No. 3, August 1966.

L. DEWAYNE RUTLEDGE, Primary Examiner

G. K. WHITE, Assistant Examiner

U.S. Cl. X.R.

75—0.5 AA, 0.5 BA